United States Patent [19]
Steingas et al.

[11] 3,880,468
[45] Apr. 29, 1975

[54] COTTON HARVESTER BASKET LOCK
[75] Inventors: Richard R. Steingas; Thomas W. Lawson, both of Memphis, Tenn.
[73] Assignee: International Harvester Company, Chicago, Ill.
[22] Filed: July 8, 1974
[21] Appl. No.: 486,278

[52] U.S. Cl. ............................... 298/11; 298/38
[51] Int. Cl. ............................................. B60p 1/34
[58] Field of Search ............. 298/1 R, 11, 12, 17 B, 298/22 R, 22 P, 22 D, 22 J, 38; 214/502

[56] References Cited
UNITED STATES PATENTS
| | | | |
|---|---|---|---|
| 2,440,325 | 4/1948 | Bruno | 298/38 X |
| 3,228,727 | 1/1966 | Paulson | 298/22 R X |

OTHER PUBLICATIONS
Operator's Manual for International Harvester, 616 & 622, Cotton Pickers – p. 63.

*Primary Examiner*—Frank E. Werner
*Attorney, Agent, or Firm*—Dennis K. Sullivan; Floyd B. Harman

[57] ABSTRACT

A cotton harvester of the type having a crop receiving basket which is hydraulically raised and tilted for dumping is provided with a sliding bar locking device for locking the basket in the dumping position, the sliding bar being provided with a notch to cause a sacrificial failure thereof upon actuation of the hydraulics to lower the basket with the locking device engaged to prevent failure of the surrounding structure.

2 Claims, 3 Drawing Figures

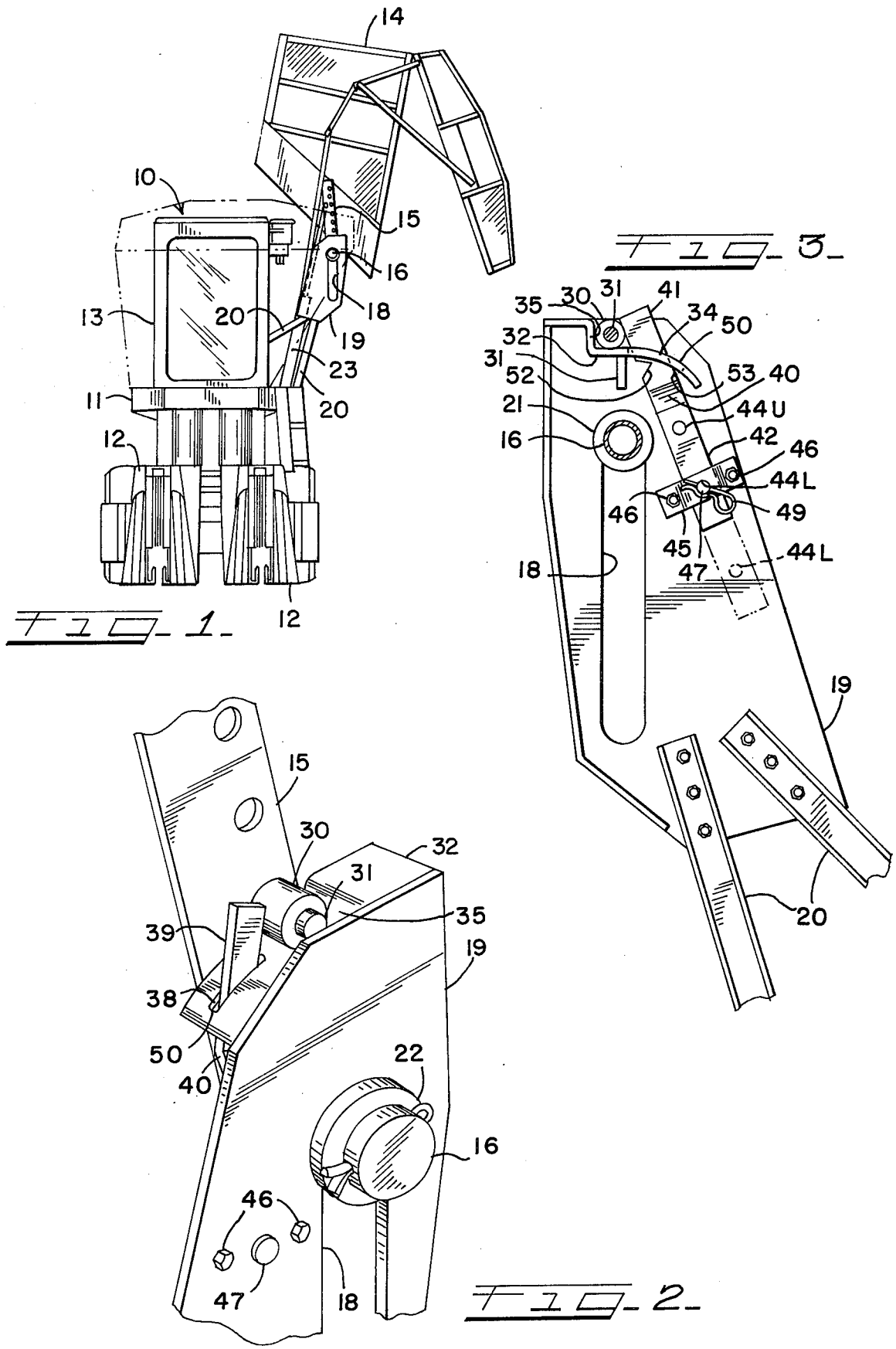

COTTON HARVESTER BASKET LOCK

BACKGROUND OF THE INVENTION

This invention relates to cotton harvester baskets of the type which are raised and tilted for dumping and, more particularly, to a novel device for locking the basket in the dumping position.

Modern cotton harvesters of the self-propelled type are generally constructed with the engine mounted on the frame beneath the basket. Often times, the basket must be placed in the dumping position to accomplish servicing or repair of engine components. Since the hydraulic mechanisms conventionally used for raising the basket tend to bleed down, thus permitting an unwanted lowering of the basket, it has previously been found to be salutary to have a mechanical locking device to maintain the basket in the dumping position. However, farmers and mechanics have been found to be as human as the rest of us and occasionally have been known to forget to disengage the mechanical locking device before lowering the basket which has resulted in portions of the frame being overloaded to the point of producing misalignments or outright failures thereof.

Accordingly, it is an object of the invention described herein to provide a simple and inexpensive basket lock for a cotton harvester to maintain the basket in the dumping position with the engine shut off.

It is further an object of the invention to provide a basket locking device for a cotton harvester of the type described which will sacrificially fail in the event of an attempt to lower the basket with the locking device engaged.

A still further object of the invention is to provide a sliding bar locking device for retaining the crop receiving basket of a self-propelled cotton harvester in the dumping position with notch means to induce failure thereof to prevent structural overloading of the harvester and basket frames.

Other objects and advantages of the invention will become apparent upon reading the following detailed description and upon reference to the drawings in which:

FIG. 1 is a front elevation of a cotton harvester incorporating applicants' basket lock;

FIG. 2 is an enlarged perspective view of the joint between the basket frame and the frame of the harvester shown in FIG. 1 illustrating applicants' basket lock; and FIG. 3 is a rear sectional view of the joint of FIG. 2 taken on a plane along the front side of the basket frame.

DETAILED DESCRIPTION OF THE PREFERRED EMBODIMENT

In accordance with the art, the terms "left" and "right" in the following description are taken to be as viewed by an operator sitting in the operator's compartment facing forward.

Turning now to FIG. 1, there is shown a self-propelled cotton harvester 10, such as a picker or stripper, of the type well known in the industry, having a wheel-supported frame 11 with forwardly mounted harvesting units 12, an operator's platform or cab 13 mounted on the forward portion of the frame 11 above the harvesting units, and a crop-receiving basket 14 mounted on the frame behind the operator's platform. Suitable conveying apparatus is provided in accordance with the art to deliver cotton from the harvesting units 12 to the basket 14 which normally rests upright on the frame, as shown in phantom in FIG. 1. An engine (not shown) which supplies power for driving the harvester as well as the harvesting, conveying, and hydraulic units, is commonly mounted on the frame 11 beneath the basket 14.

The basket 14 has a rigid framework which includes frame member 15 on both its front and rear faces. Since the structure at the rear of the basket and its mounting to the frame thereat is the same as at the front, except being a mirror image thereof, only the front portion will be described. An elongated fore and aft extending pivot rod or shaft 16 is integrally attached as by welding to the frame member 15, the shaft running along the upper left hand side of the basket 14, as shown in FIG. 1. The pivot shaft 16 extends forwardly of the basket 14 through an upright slot 18 formed in an upright plate 19 located just forwardly of the front of the basket 14, the plate 19 being rigidly attached to the harvester frame 11 through the frame members 20. The shaft or rod 16 can rise or fall in the slot 18 and is prevented from fore and aft movement therein by a flange 21 (FIG. 3) attached to the shaft 16 and a washer 22 (FIG. 2) which are located respectively on either side of the plate 19. The upper end of the slot 18 serves as a fore and aft pivot about which the shaft 16 and the entire basket 14 may pivot for dumping the basket.

A pair of generally vertically extending hydraulic cylinders 23 interconnect the front and rear basket frame members 15 with the harvester frame 11 so that upon actuation, the cylinders 23 extend and first raise the basket 14 and shaft 16 in the slots 18 and, upon the shaft 16 reaching the top of the slots, cause the basket 14 to pivot about the axis of the shaft 16 for dumping, as shown in FIG. 1. Those skilled in the art will recognize that the foregoing has been a description of a conventional basket tilting and dumping mechanism which may be found, for example, on the 95 Cotton Harvester manufactured by the International Harvester Company, the description being intended to provide an environment for applicants' invention.

Referring now to FIGS. 2 and 3, the frame member 15 of the basket 14 is provided with a free turning roller 30, which is rotatably mounted on a pin 31 attached to the member 15. The roller 30 is so located relative to the pivot shaft 16 as to ride on or slightly above a support member 32 welded on the rear side of the plate 19 above the slot 18. Support member 32 has an arcuate surface 34 which is generally radial about the axis of the shaft 16 when the shaft is at the top of the slot 18, the arcuate surface 34 terminating in a perpendicular stop surface 35 which is so located as to prevent the basket 14 from tilting overcenter beyond the point where it may be lowered by retracting the hydraulic cylinders 23. It has been found preferable to provide a support member 32 with a gusset 36 welded therebeneath since the support members 32 at the front and rear may carry all of the weight on the basket 14 if the cylinders 23 lost their pressure with the basket locked in the dumped position, as may occur with the engine shutoff for servicing.

The arcuate surface 34 of the support member 32 is provided with a circumferentially extending slot 38, slot 38 being of sufficient size to receive a locking bar 39 which may pass therethrough in a generally radial direction, as shown in FIG. 3, the locking bar 39 comprising an elongated flat strip having its major dimension parallel to the plate 19. Intermediate its ends, the bar 39 has a transition section 40 which angles downwardly toward the plate 19 dividing the bar 39 into an upper portion 41 and a lower portion 42, the lower portion 42 being provided with a pair of holes 44U, 44L spaced longitudinally thereon. The lower portion 42 of the locking bar is slidably received between the plate 19 and a locking strap 45 bolted thereto by bolts 46, the plate 19 and strap 45 having axially aligned holes to receive a removable pin 47 which extends therethrough and through one of the holes 44 in the locking bar 39 to lock the bar in place, a retaining clip 49 preventing the pin 47 from falling out. The holes 44 are so located in the locking bar 39 that if the lower hole 44L is held by the pin 47, as shown in FIG. 3, the upper end 41 of the locking bar may extend through the slot 38 in the support member 32, thereby trapping the basket roller 30 against the stop 35 to retain the basket 14 in the raised position. Conversely, if the upper hole 44U is used, the upper end 41 of the bar 39 will be withdrawn from the slot 38 thereby permitting normal raising and lowering of the basket.

It can be seen that when the bar 39 is in the upper or locking position, the end 50 of the slot 38 away from the roller stop 35 functions as a fulcrum for the bar 39 since the lower end 42 of the bar is retained in the locking strap 45. A notch 52 is placed in the upper portion 41 of the locking bar 39 on the side opposite the fulcrum point 53, the notch being located longitudinally between the fulcrum point and the contact point 53, the notch being located longitudinally between the fulcrum point and the contact point with the roller 30. The depth of the notch 52 in the bar 39 is best determined empirically for a given basket and frame design. However, it should be sufficiently deep that, upon actuation of the hydraulic cylinders 23 to lower the basket, the locking bar will be sheared off if it is in the upward or locking position, thus avoiding damage to the frame structure. Conversely, the notch 52 must be shallow enough that the bar will have sufficient strength, including a factor of safety, to prevent the basket from lowering with the hydraulic cylinders vented to atmosphere, that is, supporting none of the basket load.

In normal operation of the cotton harvester, the locking bar 39 will be out of the way in the position shown in phantom in FIG. 3. When it is desired to lock the basket 14 in the raised position, for example to service the harvester engine, the hydraulic cylinders 23 are actuated to raise the basket to the position shown in FIG. 1, thus placing the roller 30 against the stop 35. The pin 47 is then removed and the locking bar 39 is manually slid upwardly between the locking strap 45 and the plate 19, the upper end 41 of the bar 39 sliding through the slot 38 to retain the roller 30 against the stop 35. The pin 47 is then inserted through the upper hole 44U in the locking bar to retain it in the locking position shown in FIG. 3. The engine is then shut off and the service work is performed.

When it is desired to lower the basket 14, the above procedure is reversed. However, should the operator forget to remove the locking bar 39 before attempting to lower the basket, the notch 52 in the locking bar will cause it to fail sacrificially thereby preventing damage to the more exensive parts of the harvester.

Thus it is apparent that there has been provided, in accordance with the invention, a cotton picker basket lock that fully satisfies the objects, aims, and advantages set forth above. While the invention has been described in conjunction with a specific embodiment thereof, it is evident that certain alternatives, modifications, and variations will be apparent to those skilled in the art in light of the foregoing description. Accordingly, it is intended to embrace such alternatives, modifications, and variations as felt within the spirit and scope of the appended claims.

What is claimed is:

1. In a cotton harvester of the type having a frame, a crop-receiving basket, means for mounting said basket on said frame, said mounting means being operable to raise and lower said basket between a lowered position for receiving crops and a raised and tilted position for dumping said basket, said basket having a roller, said frame having an arcuate surface portion engaged by said roller and having a radial stop surface therefor to limit the travel of said basket toward the dumping position, hydraulic means for operating said mounting means, and selectively operable means for retaining said basket in said dumping position, the improvement wherein said retaining means comprises a bar slidably mounted on said harvester frame, said bar being disposed for longitudinal movement through said arcuate surface portion between a first inoperative position and a second position trapping said roller against said radial stop surface.

2. The invention in accordance with claim 1 in said bar having a notch so located and of such a depth that upon actuation of said hydraulic means to lower said basket with said bar in said second position, said bar will be sheared off without damage to the surrounding structure.

* * * * *